United States Patent [19]

Godin

[11] Patent Number: 5,033,662
[45] Date of Patent: Jul. 23, 1991

[54] VEHICLE-MOUNTED CARRIER SYSTEM

[76] Inventor: Patrick Godin, 25 Birch Hill Dr., West Hartford, Conn. 06107

[21] Appl. No.: 478,576

[22] Filed: Feb. 12, 1990

[51] Int. Cl.[5] .............................................. B60R 9/06
[52] U.S. Cl. ....................... 224/42.430; 224/42.03 A; 296/43; 296/57.1
[58] Field of Search .......... 224/42.43, 42.44, 42.03 A, 224/42.07, 42.03 B, 42.08, 324, 42.33, 42.34, 42.35, 42.36; 280/35, 37; 296/26, 36, 43, 57.1, 164, 165, 180, 27, 40; 248/220.1

[56] References Cited

U.S. PATENT DOCUMENTS

| | | | |
|---|---|---|---|
| 434,342 | 8/1890 | Jones | 296/57.1 X |
| 2,746,659 | 5/1956 | Caruolo | 224/42.07 |
| 2,777,625 | 1/1957 | Kronhaus et al. | 224/42.43 |
| 2,926,021 | 2/1960 | Altadonna | 296/43 |
| 3,039,634 | 6/1962 | Hobson et al. | 224/42.03 R |
| 3,202,332 | 8/1965 | Walker | 224/42.03 A |
| 3,251,520 | 5/1966 | VanDyke et al. | 224/42.03 |
| 3,905,527 | 9/1975 | Chamberlain | 224/42.03 |
| 4,072,257 | 2/1978 | Hall | 224/29 R |
| 4,138,152 | 2/1979 | Prue | 293/117 |
| 4,216,988 | 8/1980 | Weiss | 296/43 |
| 4,676,413 | 6/1987 | Began et al. | 224/42.03 |
| 4,676,415 | 5/1987 | Kennedy | 224/42.06 |
| 4,744,590 | 5/1988 | Chesney | 224/42.08 |
| 4,813,584 | 3/1989 | Wiley | 224/42.44 |
| 4,906,015 | 3/1990 | LaCroir et al. | 224/42.07 |
| 4,915,276 | 4/1990 | Devito | 224/42.03 A X |

*Primary Examiner*—Henry J. Recla
*Assistant Examiner*—Glenn T. Barrett
*Attorney, Agent, or Firm*—Ira S. Dorman

[57] ABSTRACT

A readily disassembled carrier includes a frame having projecting arms that are telescopically engaged with mated tubular pieces attached to the chassis of the vehicle with which the carrier is to be used, and an assemblage of removable panels that cooperate to form a container on the frame. Projecting blocks are provided to limit insertion of the arms into the tubular pieces, and sockets on the frame seat the ends of posts provided on the panels, inserted downwardly thereinto, with flanges on corner bracket pieces slipping into one another for interengagement of adjacent panels.

7 Claims, 4 Drawing Sheets

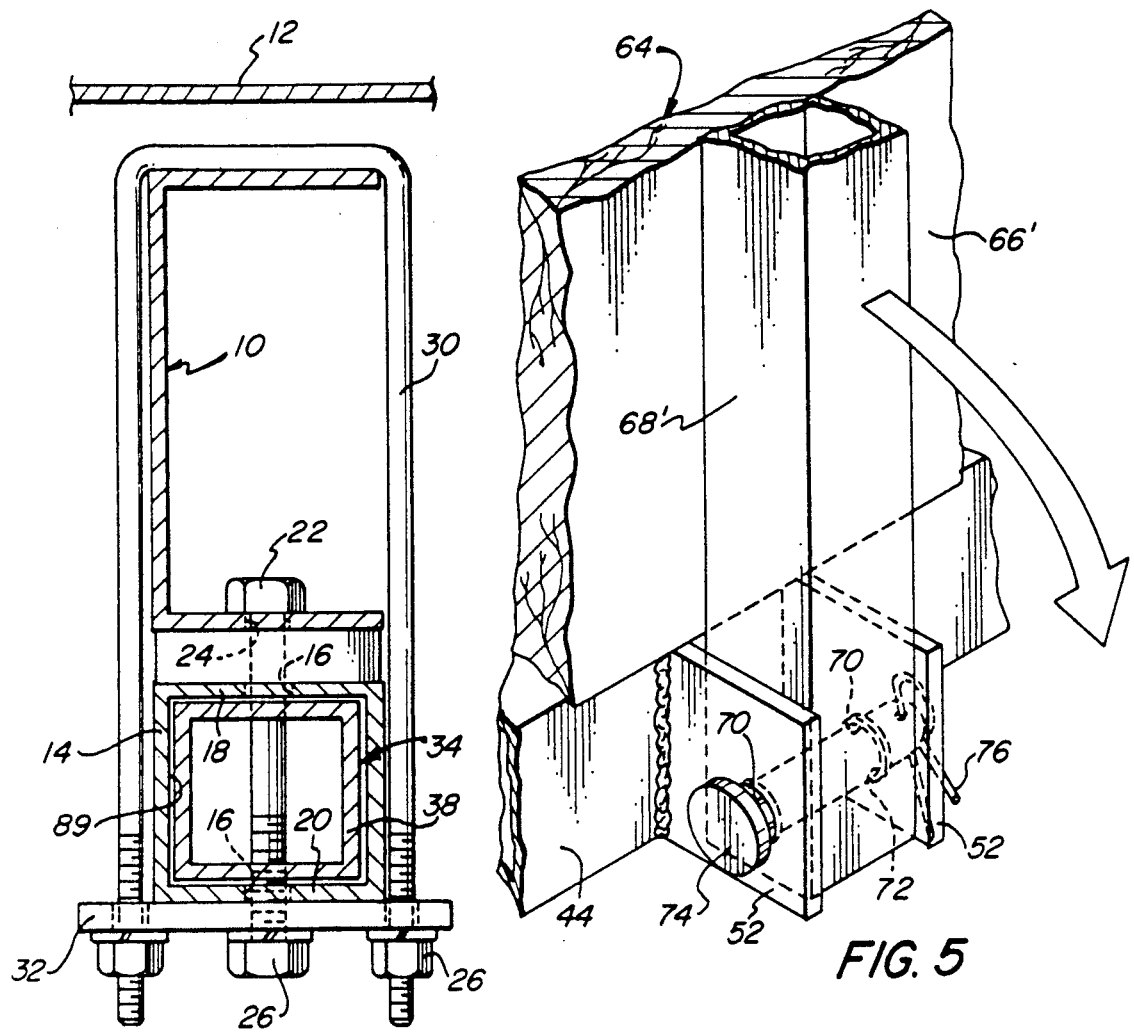
FIG. 4
FIG. 5
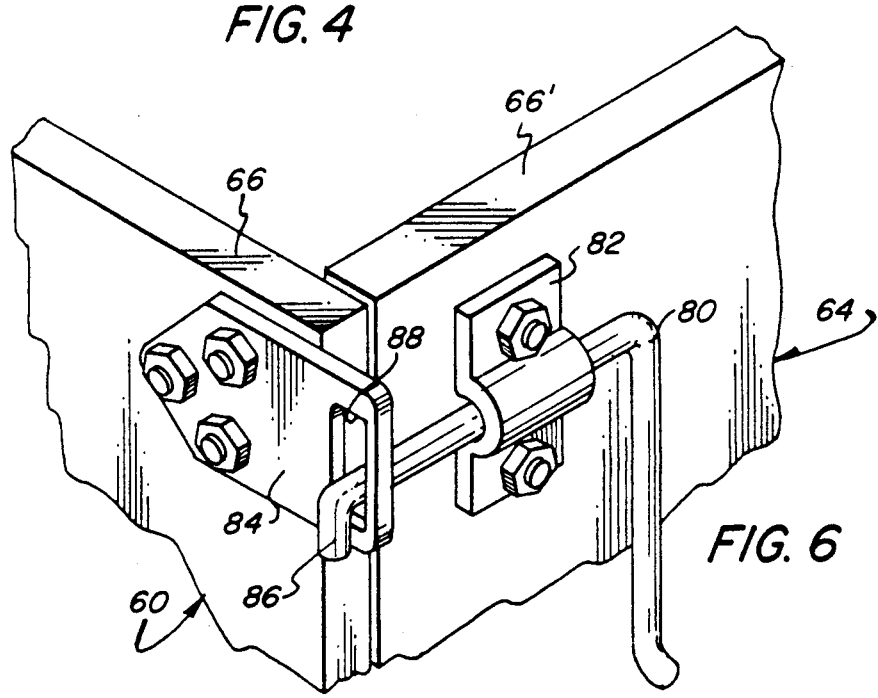
FIG. 6

VEHICLE-MOUNTED CARRIER SYSTEM

BACKGROUND OF THE INVENTION

As shown by the disclosures of the following United States patents, vehicle-mounted carriers, adapted for transporting a variety of loads, are known in the art:

VanDyke et al No. 3,251,520 shows a carrier for a motorcycle or bicycle, which includes a supporting unit comprised of parallel frame members telescopically received by outer frame members, which are mounted upon the chassis of a camper-truck. Attachment of the outer frame members is achieved With brackets, and removable bolts serve to allow selective disengagement of the inner frame members, and to lock them in position.

Hall No. 4,072,257 is generally similar, providing apparatus for carrying a motorcycle or bike on a vehicle, in Which the supporting platform is mounted upon parallel struts that are telescopically received within and secured to brackets mounted on the vehicle frame; the apparatus may be employed to carry a trunk or other items.

Frue No. 4,138,152 shows a storage box attached to and supported by parallel rods, Which are slidably received within box-like structures secured to plates, the plates in turn being bolted to the vehicle frame; the storage box of the patent functions as the vehicle bumper.

Chamberlain No. 3,905,527, Began et al No. 4,676,413, and Kennedy No. 4,676,415 disclose frame-mounted support systems for carriers of various kinds.

Despite the foregoing, a need remains for a vehiclemounted carrier system which permits ready assembly and disassembly of the carrier, for convenient use and storage and facile connection thereof to an associated vehicle. Accordingly, it is an object of the invention to provide such a carrier system.

Other objects of the invention are to provide a carrier system having the foregoing features and advantages, wherein the system is, in addition, of relatively uncomplicated and inexpensive construction, and yet highly durable and capable of transporting large and heavy loads

SUMMARY OF THE INVENTION

It has now been found that the foregoing and related objects of the invention are attained by the provision of a carrier system that includes a frame having a platform portion with engagement means disposed about its periphery, and having a pair of substantially identical elongate support members With parallel rectilinear end portions that extend laterally outwardly beyond the periphery at one side thereof. The system also includes a pair of elongate, rectilinear mounting members adapted for attachment to the chassis of a vehicle and for coaxial telescopic interengagement with the support members of the frame. Means is provided of securing the mounting members to the vehicle chassis, and abutment elements on the mounting members are disposed to engage abutment elements on the support members when the parts are fully inserted, one within the other, to thereby prevent further movement beyond that position.

A bottom wall member is supported by the platform portion of the frame, and a multiplicity of sidewall members are assembled With the frame and extend about the bottom Wall member to cooperatively define an upwardly opening container. Each sideWall member has a bottom edge portion and at least one element adjacent thereto for engagement With the engagement means of the frame platform portion, so as to support the sidewall member in an upstanding relationship; adjacent sidewall members are interengaged by joining means provided thereon for that purpose. The engagement elements and the joining means of at least a plurality of the sidewall members are engagable with the engagement means of the platform portion, and with one another, respectively, by movement of the sidewall members toward the platform portion; they are disengagable by movement in the opposite direction.

The mounting members will generally be of tubular construction, open at least at one end and dimensioned and configured to receive therethrough, and to snugly engage therewithin, the end portions of the associated support members. At least one aperture may be formed through a wall portion of each tubular member, with the associated securing means comprising a bolt adapted to pass through the aperture. The outer surfaces of the mounting members may function as abutment elements, by engaging outwardly extending pieces on the end portions of the support members when they are fully inserted into the mounting members.

The sidewall members Will usually comprise panel units having at least one attached post, a lower end portion of the posts projecting beyond an edge of the panel portion to provide the requisite engagement element. A plurality of socket elements, disposed at spaced locations about the periphery of the platform portion, may advantageously provide the engagement means, each such element defining an upwardlyopening socket dimensioned and configured to slidably receive, and snugly seat, the lower end portion of one of the posts. The joining means will preferably comprise a plurality of mated pairs of plates at the corners of the container, with each plate having a open-ended, rectilinear slot defining a flange portion outwardly therealong, the slots of the plates of each pair opening in directions opposite to one another The structure of the plates, and their positions on the adjacent panel units, so position the slots as to enable interdigitated interengagement of the flange portions of each pair thereof with the panel units assembled on the carrier frame.

In the preferred embodiment, one of the panel units Will be hingedly mounted on the platform portion of the frame, using a hinge element on the post of the unit and a hinge fixture on the frame. The hinge element may constitute a transverse passageway through the post, and the hinge fixture may comprise a hinge pin and a pair of spaced ears affixed to the frame. The engagable end portion of the post will be disposed between the ears on the frame, with its passageway aligned with the apertures thereof and with the hinge Pin extending therethrough, the pin being readily removable to permit facile disassembly of the panel unit.

The joining means employed on such a hinged panel unit will desirably comprise a pair of latching members, in which case the adjacent panel units Will have latch components disposed thereon. The latch components Will be so constructed as to cooperate with the latching members for disengagable securement of the adjacent units in the container assemblage.

BRIEF DESCRIPTION OF THE DRAWINGS

FIG. 4 is a fragmentary sectional view of the mounted carrier assembly, taken along line 4—4 of FIG. 2 and drawn to a scale further enlarged therefrom;

FIG. 5 is a fragmentary perspective view drawn to substantially the scale of FIG. 4, showing the arrangement by which the rear panel unit is hinged to the carrier frame;

FIG. 6 is a similar view showing the latching mechanism by which the hinged panel unit is held in elevated position;

DETAILED DESCRIPTION OF THE ILLUSTRATED EMBODIMENTS

Figure 1:
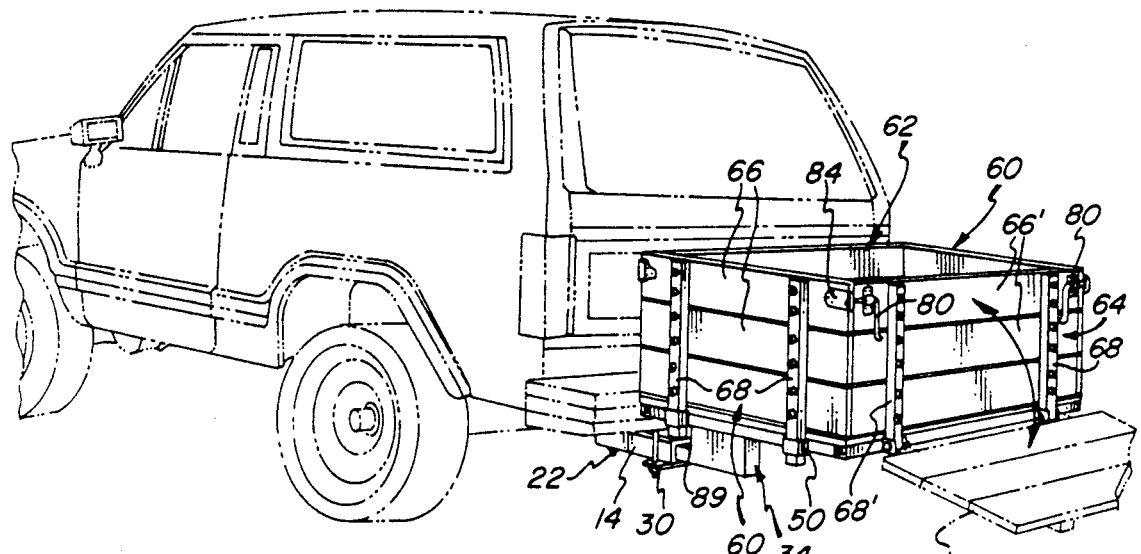
FIG. 1 is a perspective view showing the carrier system of the invention installed on a utility vehicle, a lowered position of the hinged rear panel unit being shown in phantom line.
Figure 2:
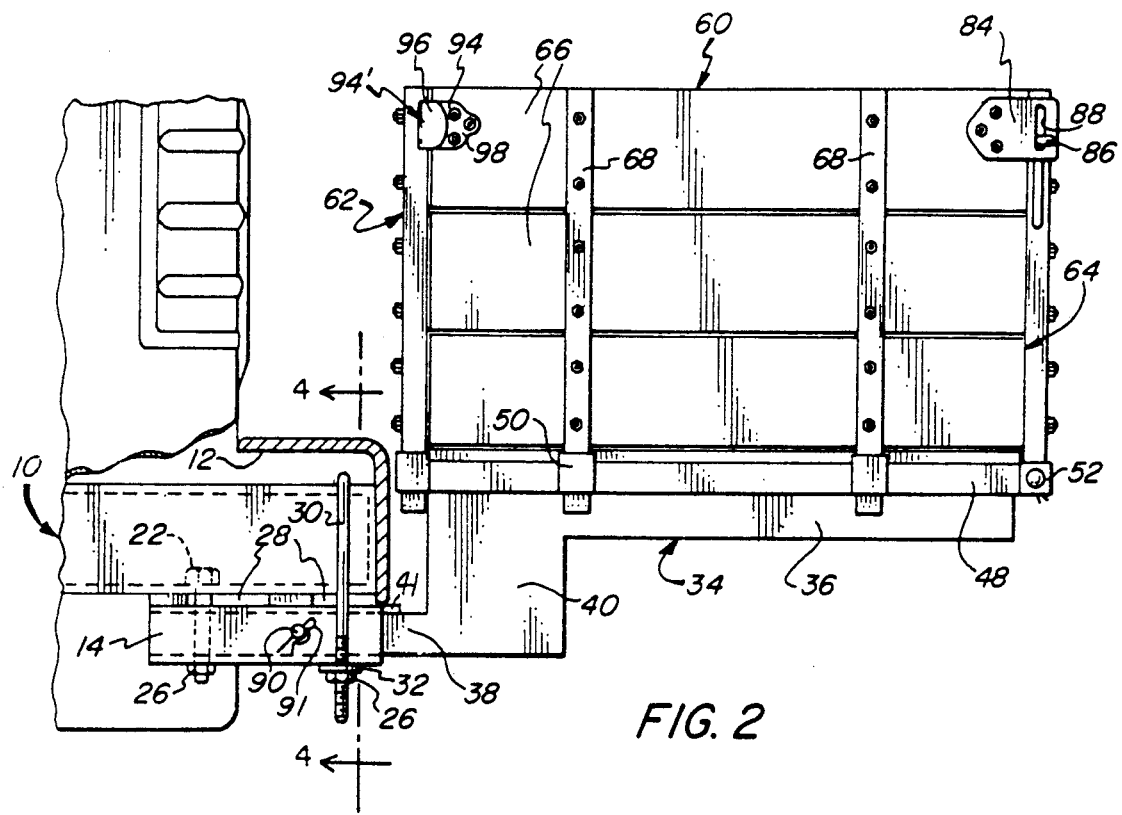
FIG. 2 is a fragmentary elevational view, in partial section, showing the installed carrier system and associated vehicle of FIG. 1, drawn to a scale enlarged therefrom.
Figure 3:
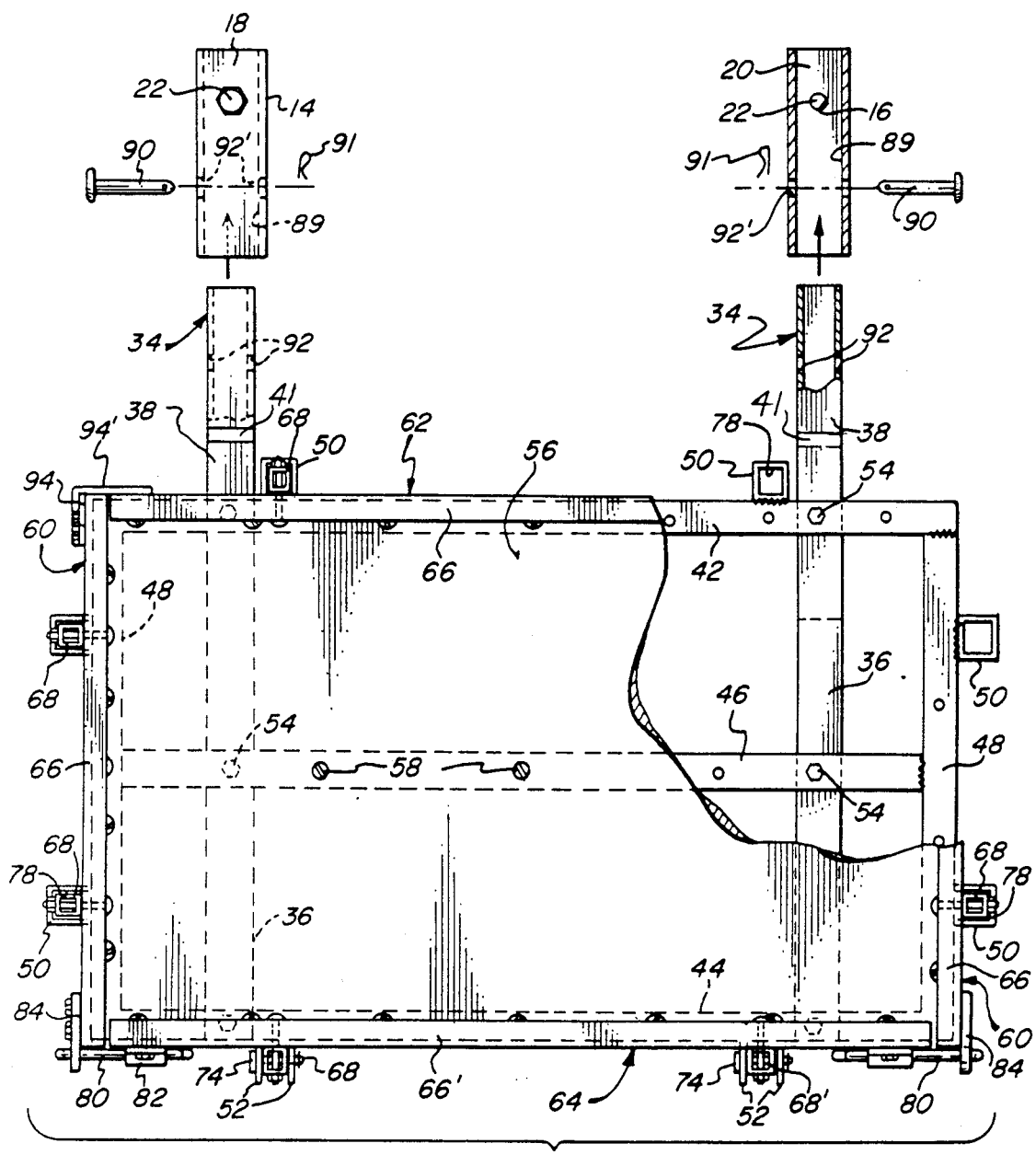
FIG. 3 is an exploded plan view showing the system of the invention with the mounting members separated from the support rails of the carrier, and with a section of the floor thereof broken away to expose underlying structure.

Turning now in detail to FIGS. 1-6 of the appended drawings, therein illustrated is a carrier system embodying the present invention, as installed on a utility vehicle. Relevant parts of the vehicle, for present purposes, are the two laterally spaced channel frame members, generally designated by the numeral 10, which extend along opposite sides of the vehicle, and the rear bumper 12. Pieces of tubular steel provide mounting sleeves 14 for the carrier; one is attached under each member 10, with spacers or shims 28 interposed therebetween. Each sleeve 14 has vertically aligned apertures 16 in its top and bottom wall portions 18, 20, respectively, through which pass a mounting bolt 22, the bolt also extending through an aperture 24 formed in the lower flange of the associated channel member 10 and cooperating with the nut 26 to secure the forward end of the sleeve 14. A U-bolt 30 extends about each channel member 10, and the cooperating transverse plate 32 passes beneath the associated sleeve 14 and is tightened on the legs of the bolt 30 with the nuts 26, thus securing the rearward end of the sleeve in place.

The carrier comprises a frame, which includes a pair of parallel rails, each rail being generally designated by the numeral 34 and having a mounting section 36, a support section 38, and an enlarged connecting section 40 from which the sections 36 and 38 extend in opposite directions and at different levels; an abutment block 41 is welded on the top of both mounting sections 38. Three crosspieces 42, 44 and 46 traverse the rails 34, in forward, rearward, and intermediate positions, respectively, and are welded to sidepieces 48; the resultant superstructure is attached to the rails 34 by use of appropriate nut and bolt fasteners 54.

Six box-like receptacles 50 are welded against the outer surfaces of the frame pieces 42, 48 at spaced locations on three sides of the carrier frame, and two pairs of spaced ears 52 are welded on the outer surface of the rearward crosspiece 44. A rectangular floor panel 56 covers the frame, and is secured in place thereupon by use of a multiplicity of nut and bolt fasteners 58.

The container of the carrier is provided by an assemblage of four panel units, which cooperate with the floor panel 56 to define an enclosure. The end and forward panel units, generally designated respectively by the numerals 60 and 62, are attached in fixed positions on the frame; the rear panel unit, generally designated by the numeral 64, is hingedly mounted to function as a tailgate.

Each panel unit is constructed from three, normally horizontal planks or boards, designated 66 or 66' depending upon length, attached to a pair of vertical posts 68 or 68'; suitable nut and bolt fasteners (unnumbered) are used for the purpose. The lower end portions of the posts extend downwardly beyond the lowest plank 66, 66', and are used for mounting the panel units upon the carrier frame. In the instance of panel units 60 and 62, the projecting end portions of the posts 68 are inserted downwardly into the sockets 78 defined within the receptacles 50. The end portions of the posts 68' of the rear panel unit 64, however, are formed with laterally aligned apertures 72, which register with apertures 70 in the ears 52 when the unit is positioned upon the crosspiece 44. Hinge pins 74 are inserted through the registered apertures 70, 72, and are fixed in place by use of cotter pins 76; the unit 64 can of course be readily separated from the frame by withdrawal of the hinge pins 74.

A latch piece 80 is pivotably and slidably mounted, at each of the opposite ends of the upper plank 66' of the panel unit 64, by an attached strip 82, which is suitably formed for the purpose. The latch piece 80 cooperates with a latch plate 84, which is attached to the upper plank 66 on the adjacent end panel unit 60, with the offset end element 86 of the piece 80 passing through the slot 88 of the plate 84 and engaging surrounding structure; as will be appreciated, elevating the handle portion of the latch piece 80 will permit withdrawal of the element 86 by sliding it laterally away from the plate 84. The end panel units 60 are joined to the forward unit 62 by use of interfitting bracket pieces attached at the corners, as will be described below.

Attachment of the carrier assembly to the vehicle is readily achieved simply by inserting the outer ends of the support sections 38 of the rails 34 into the passages 89 through the sleeves 14, in telescoping fashion. When the sections 38 are fully inserted, with the blocks 41 abutted against the ends of the sleeves 14, the laterally aligned apertures 92 in the sections 38 will automatically register with the corresponding apertures 92' in the sidewalls of the sleeves 14, to permit insertion of the locking pins 90. This feature facilitates attachment, especially when the carrier is heavy or particularly cumbersome; the locking pins 90, secured in place by use of cotter pins 91, serve of course to prevent inadvertent disassembly.

Figure 7:
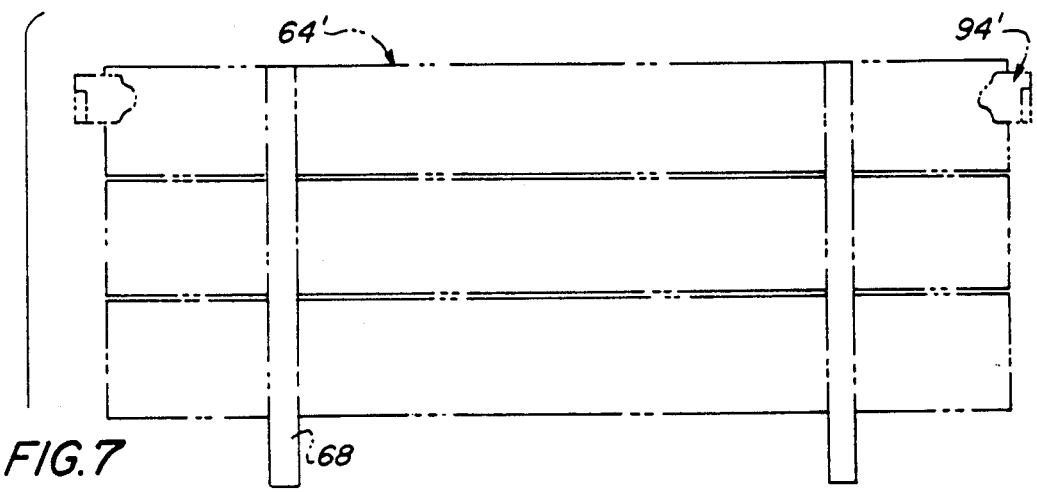
FIG. 7 is a rear elevational view showing a second embodiment of the carrier of the invention, in which the rear panel unit is non-hingedly mounted, the unit being removable by upward withdrawal from the frame, as depicted in phantom line.
Figure 8:
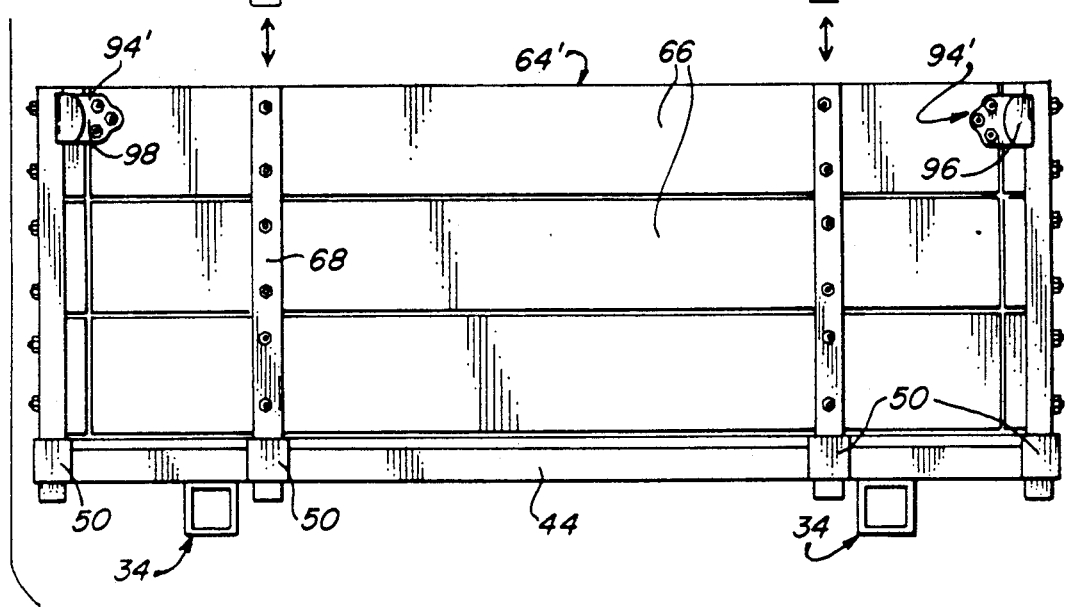
FIG. 8 is a side elevational view of the carrier of FIG. 7.
Figure 8:
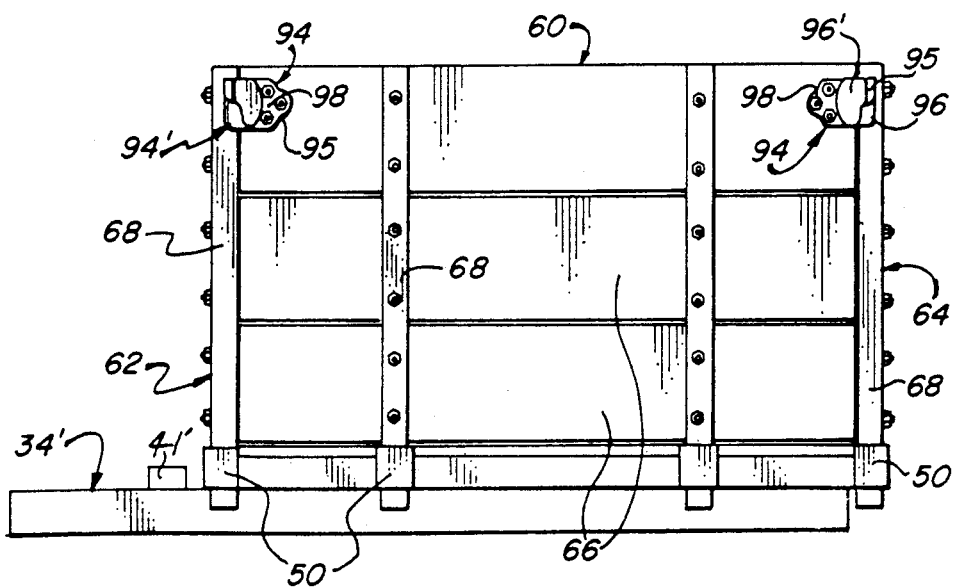

Turning now in detail to FIGS. 7 and 8 of the drawings, a second embodiment of the carrier is illustrated, which differs from that of FIGS. 1-6 in the use of simple, straight supporting rails 34' (on which abutment blocks 41' are provided), in place of the compound form of rails shown in the previous Figures; it also differs in regard to the nature of the rear panel unit employed. As to the latter, the unit 64' is of the same construction as the front panel unit 62, and is consequently assembled on the frame by inserting the loWer ends of its posts 68 into the receptacles 50, Which are provided on the rear crosspiece 44 in lieu of ears 52; furthermore, all of the panel units are joined to one another by use of interfitting bracket pieces 94, 94'.

As is best seen in these Figures, each bracket piece consists of a plate that is slotted either upWardly or downwardly (thus distinguishing pieces 94 from pieces 94') to enable interdigitated engagement between mated pairs. The flange elements 96, defined on the outer end of each bracket by the slot 95, are disposed perpendicularly to the mounting elements 98, to provide corner joints in Which the element 96, on the bracket of one panel unit bears upon the mounting element 98, of the bracket attached to the adjacent unit. In the form illustrated, it Will be appreciated that the end panel units 60 Will be mounted first upon the frame, so that when the forward and rearward units 62, 64' are assembled thereWith, the upwardly slotted brackets 94' on the latter Will engage with the downwardly slotted ones 94 on the former.

As Will be appreciated variations, other than those hereinabove described, in the form and structure of the carrier system of the invention, and of the parts and components thereof, may of course be made without departure from the novel concept of the invention. For example, the abutment means that serves to limit the depth of insertion of the support members into the mounting members (or vice versa), may constitute elements extending from the support members and disposed to interfere With a U-bolt by which the mounting members are secured. Of course, the mounting means itself may vary, depending upon the nature of the chassis of any given vehicle With which the system is to be used, and additional modifications Will readily occur to those skilled in the art, in view of the foregoing specification.

Thus, it can be seen that the present invention provides a novel vehicle-mounted carrier system Which permits ready assembly and disassembly of the carrier for convenient use and storage, as well as facile connection thereof to an associated vehicle. The system of the invention is, in addition, of relatively uncomplicated and inexpensive construction, and yet highly durable and capable of transporting large and heavy loads.

Having thus described the invention, what is claimed is:

1. A readily disassembled, vehicle-mounted carrier system comprising:
a frame having a platform portion with a generally rectangular periphery, and with engagement means comprised of a plurality of socket elements disposed at spaced locations about said periphery, and having a pair of substantially identical elongate support members with rectilinear end portions extending laterally outwardly from one side of said platform portion beyond said periphery thereat and parallel to one another;
a pair of elongate, rectilinear mounting members adapted for attachment to a vehicle and for coaxial telescopic interengagement with said support members of said frame;
means for securing said mounting members to a vehicle;
a bottom wall supported by said platform portion of said frame;
a multiplicity of sidewall members assembled with said frame and extending about said bottom wall to define an upwardly opening container therewith of generally rectangular cross sectional configuration, each of said sidewall members comprising a planar panel unit with a planar portion having a bottom edge, and including at least one attached post, an end portion of said post projecting beyond said bottom edge to provide an engagement element for engagement with one of said socket elements of said frame platform portion to support said sidewall member in upstanding relationship thereto, each of said socket elements defining an upwardly-opening socket dimensioned and configured to slidably receive and snugly seat said end portion of one of said posts therewithin, said end portion of said post of at least a plurality of said sidewall members being engagable with said socket elements of said platform portion by movement of said plurality of sidewall members toward said platform portion, and being disengagable by movement thereof in the direction opposite thereto, said sidewall members also having joining means thereon interengaging adjacent sidewall members int he assemblage thereof, said joining means on said plurality of sidewall members being engagable and disengagable by the same movement, toward and away from said platform portion, of at least one of said plurality of sidewall members, and comprising a plurality of mated pairs of plates secured to said panel units providing said plurality of sidewall members and disposed at corners of said container, each of said plates having an open-ended, rectilinear slot defining a flange portion outwardly therealong, said slots of said plates of each pair opening in directions opposite to one another, and said plates being so constructed and disposed on adjacent panel units as to position said slots for interdigitated interengagement of said flange portions of said plates of each of said pairs thereof.

2. The system of claim 1 wherein each of said mounting members is of tubular construction, open at least at one end and dimensioned and configured to receive through said one end, and to snugly engage therewithin, said end portion of one of said support members.

3. The system of claim 2 wherein each of said end portions of said support members has a pair of laterally aligned apertures in opposite sidewall portions thereof, and wherein each of said mounting members has a pair of laterally aligned apertures in opposite sidewall portions thereof, said pair of apertures in each of said end portions being in registry with said pair of apertures in said mounting member engaged therewith in a fully inserted relationship thereof.

4. The system of claim 2 wherein said end portion of each of said support members has at least one aperture through a wall portion thereof for receiving a mounting bolt, and wherein said means for securing associated therewith comprises a bolt adapted to pass through said aperture.

5. The system of claim 1 wherein one of said panel units has a hinge element on said end portion of said post thereof, and wherein said engagement means includes a hinge fixture disposed on a section of said platform portion of said frame opposed to said one side thereof, said fixture comprising a hinge part disengagably joined to said hinge element on said post to hingedly mount said one unit on said frame.

6. The system of claim 5 wherein said hinge element on said post of said one panel unit constitutes a transverse passageway therethrough; and wherein said hinge fixture comprises a hinge pin and a pair of spaced ears affixed to said frame, said ears having laterally aligned apertures therethrough, said end portion of said post of said one unit being disposed betWeen said ears with said passageWay and said apertures thereof aligned, said pin extending through said apertures and said passageway to hingedly mount said one unit on said frame, said hinge pin being readily removable from said apertures and passageway to permit facile disassembly of said one panel unit.

7. The system of claim 6 wherein said joining means on said one panel unit comprises a latching member; and wherein the panel units adjacent said one unit have latch components thereon disposed to cooperate with said latching member for disengagable securement of said one panel unit in said assemblage.

* * * * *